Jan. 1, 1924
E. R. TOZER
1,479,116
THREAD GRINDING MACHINE
Filed Feb. 24, 1920
8 Sheets-Sheet 7
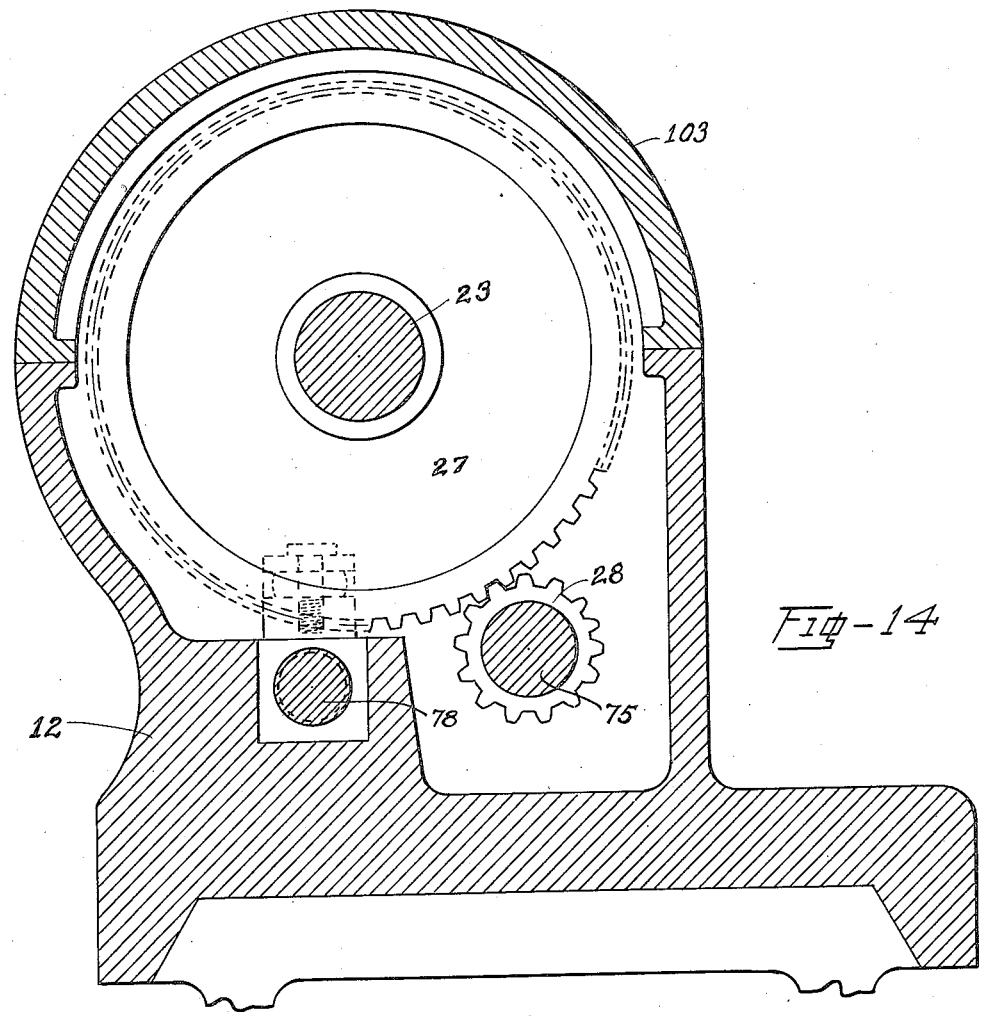
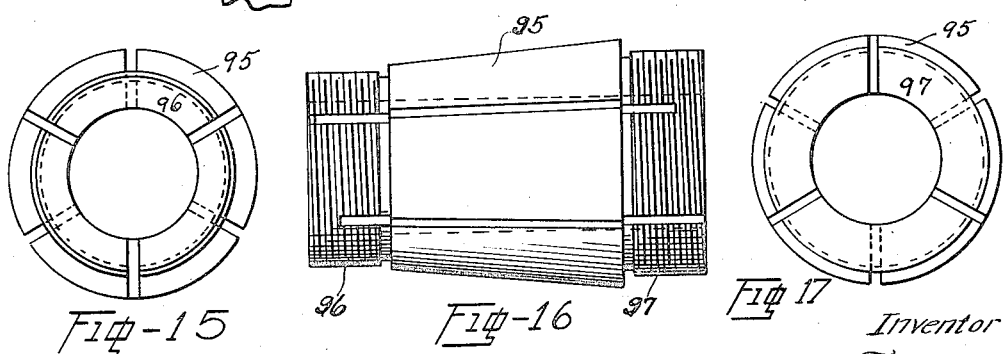

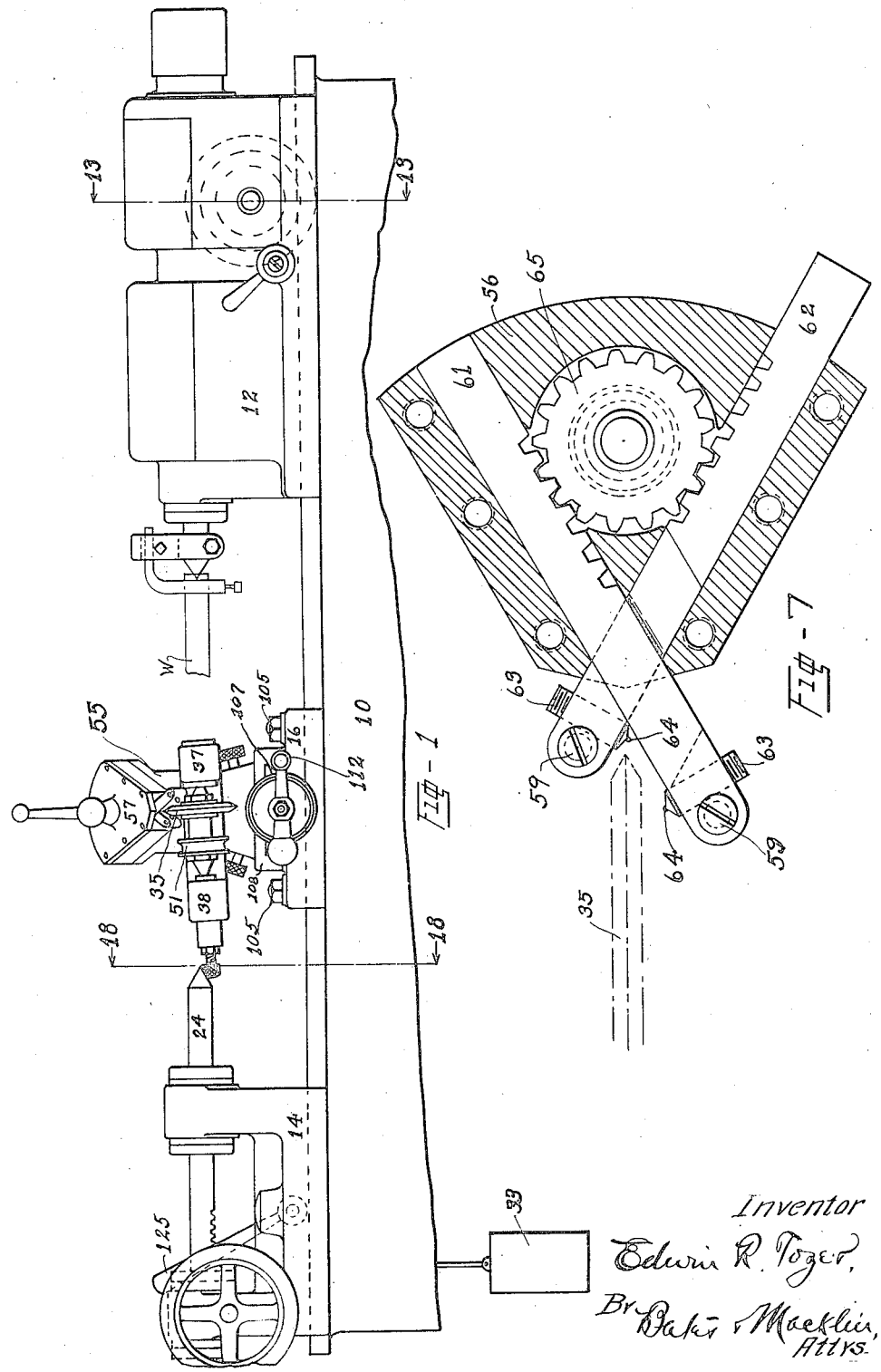

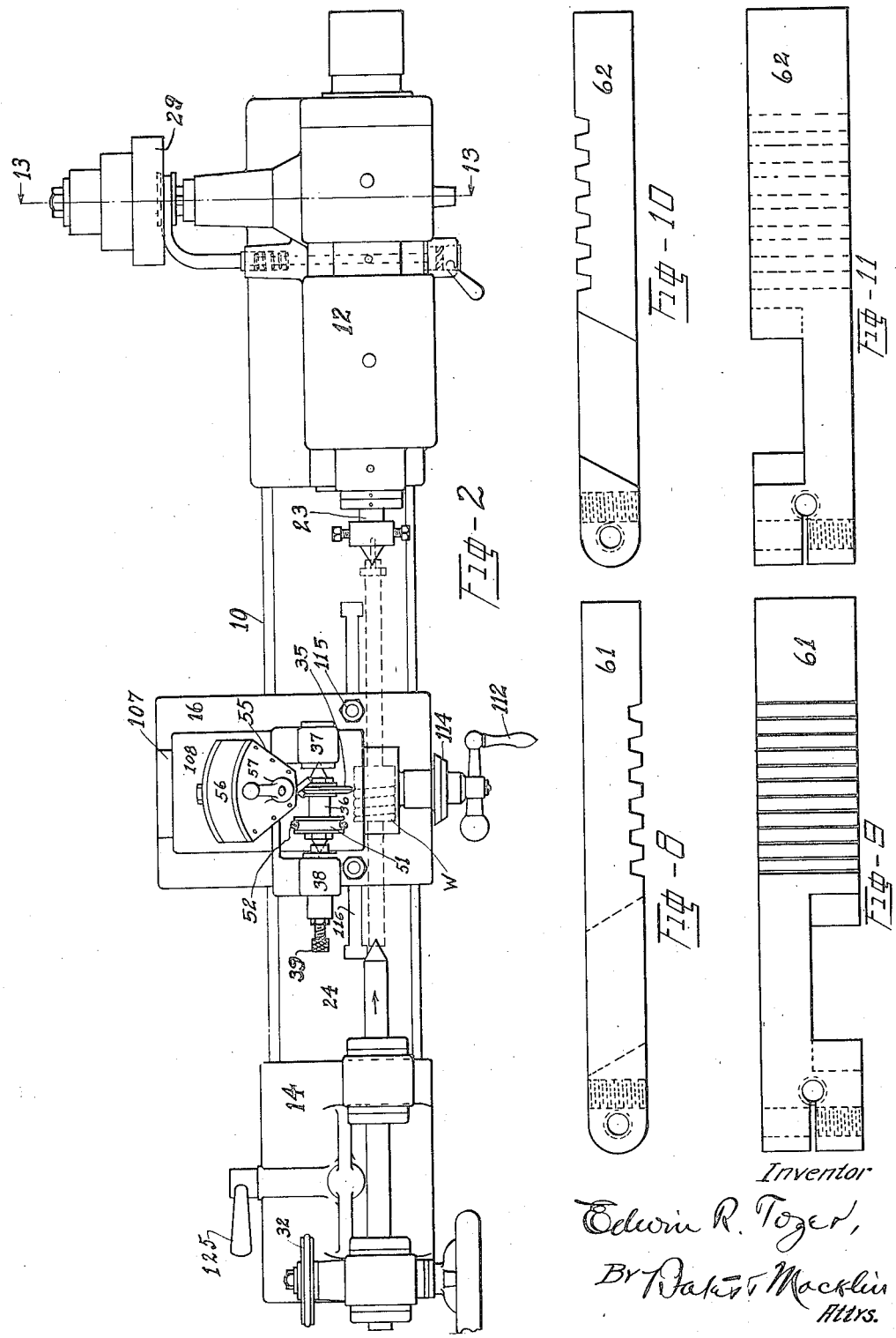

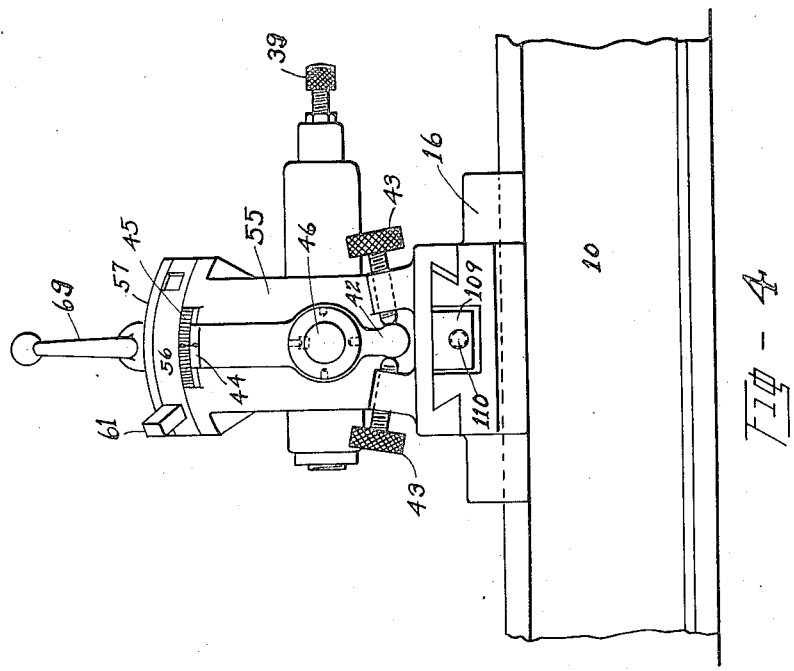
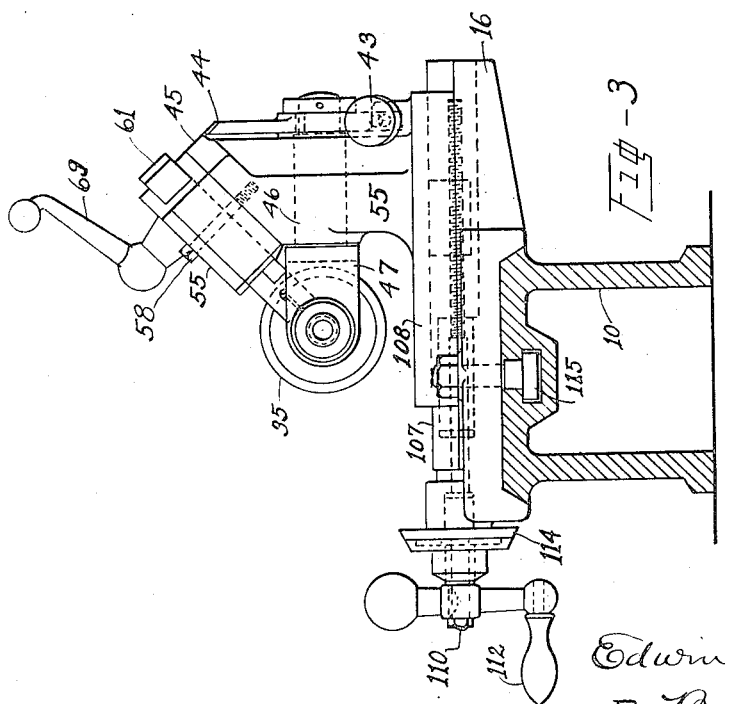

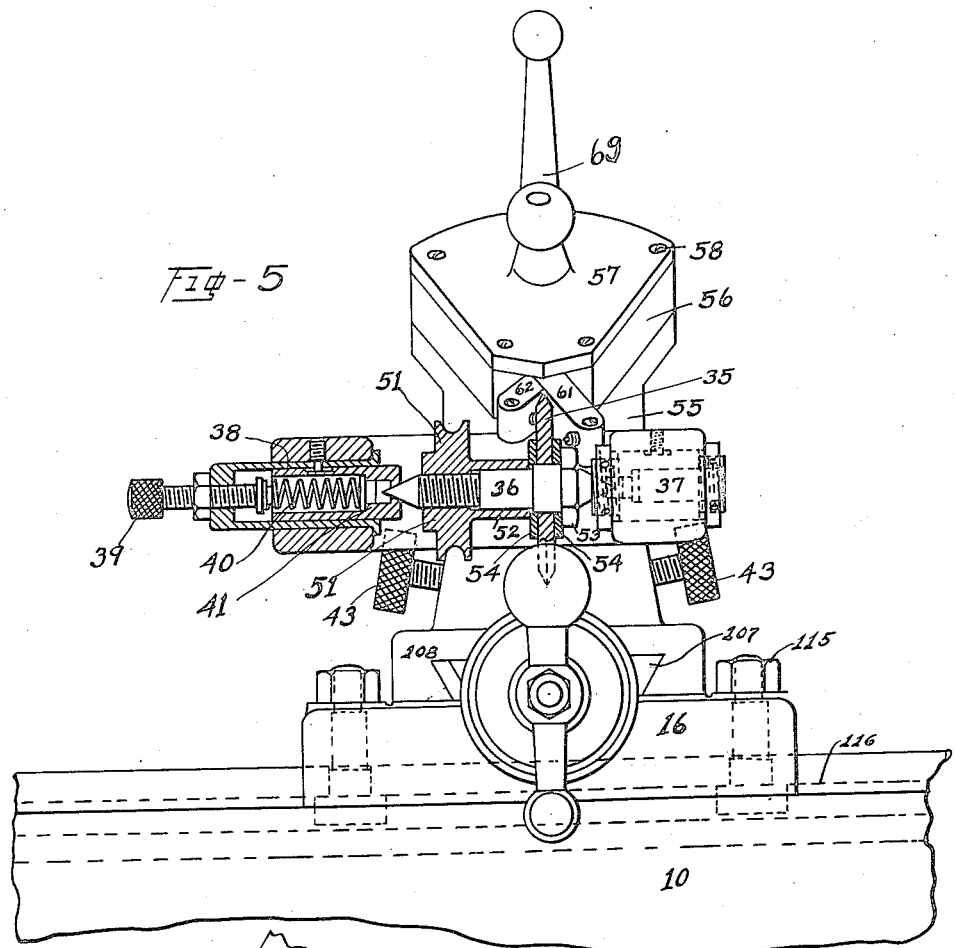
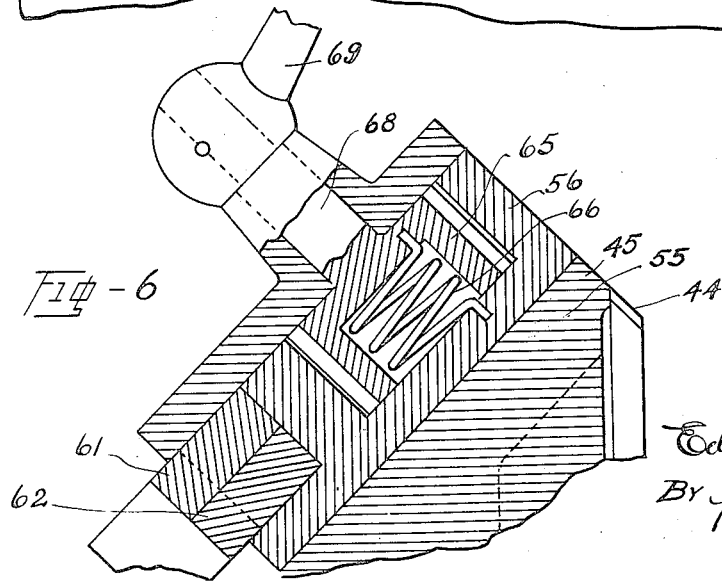

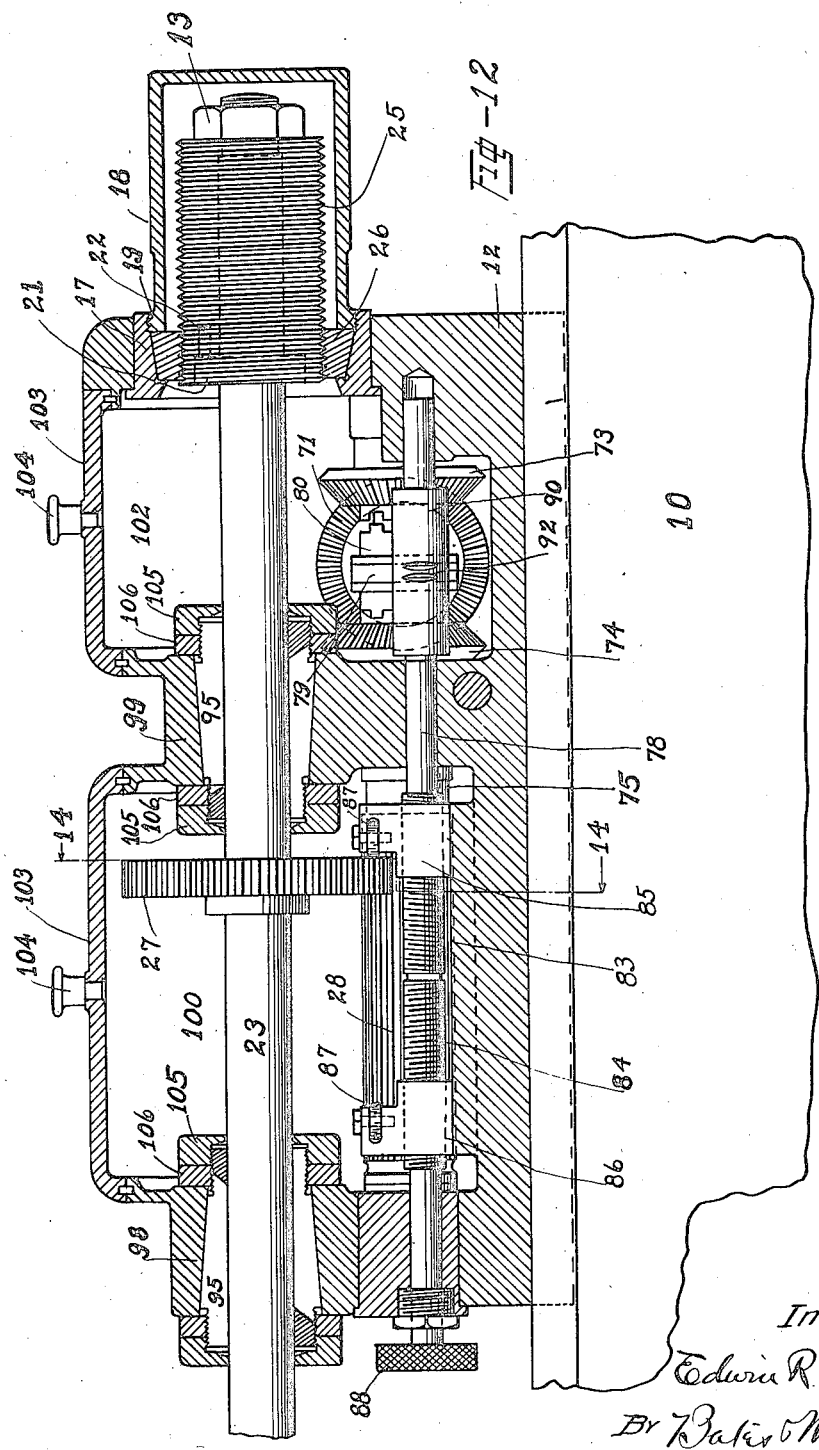

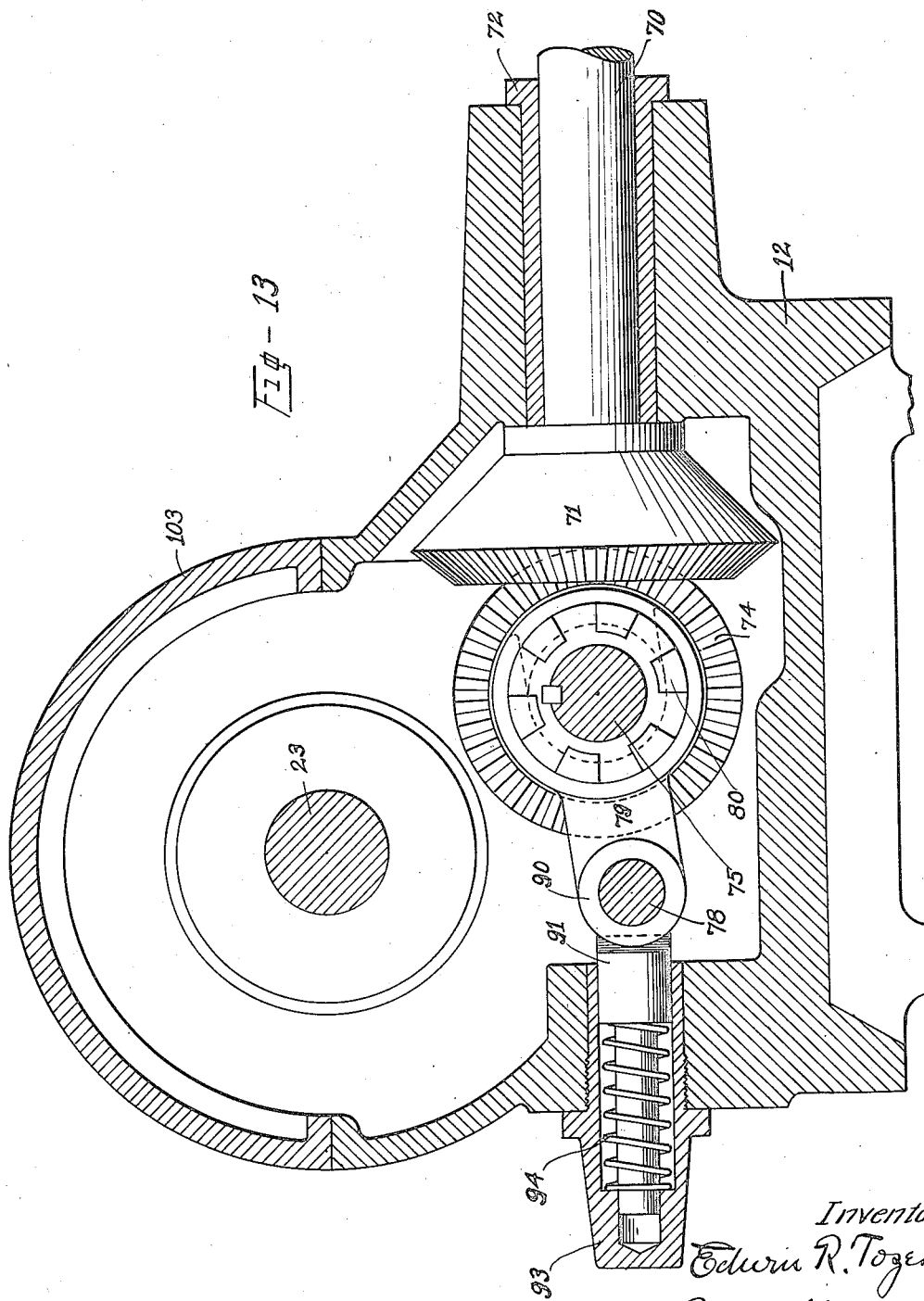

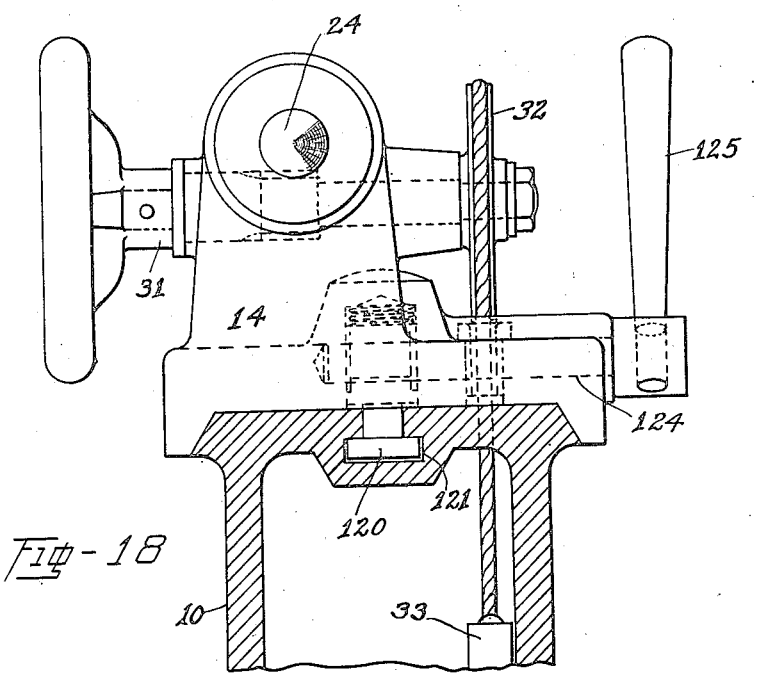
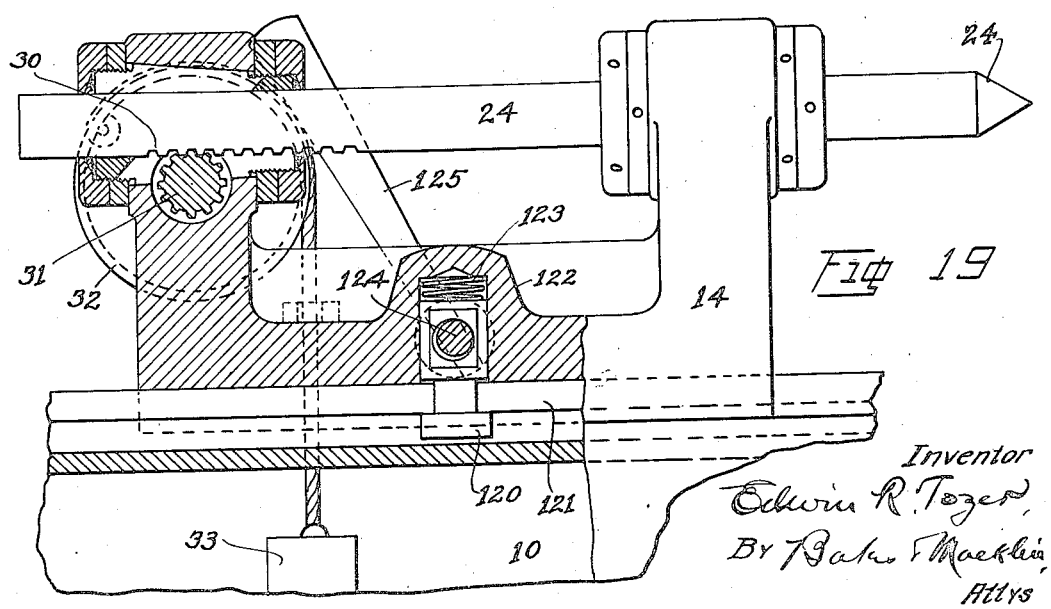

Patented Jan. 1, 1924.

1,479,116

UNITED STATES PATENT OFFICE.

EDWIN R. TOZER, OF LAKEWOOD, OHIO, ASSIGNOR TO THE J. C. ULMER COMPANY, OF CLEVELAND, OHIO, A CORPORATION OF OHIO.

THREAD-GRINDING MACHINE.

Application filed February 24, 1920. Serial No. 361,060.

*To all whom it may concern:*

Be it known that I, EDWIN R. TOZER, residing at Lakewood, in the county of Cuyahoga and State of Ohio, have invented a certain new and useful Improvement in Thread-Grinding Machines, of which the following is a full, clear, and exact description, reference being had to the accompanying drawings.

This invention relates to means for grinding screw threads with great accuracy for what is known as high precision work.

An object of the invention is to provide a simple effective mechanism for such purpose that shall be efficient in operation and durable in use. More specific objects include attaining rigidity and simplicity of means by which a master screw or hob governs the relative motion of the grinding wheel and the work, and the provision of means for automatically reversing the movement of the work to feed it back and forth with relation to the grinding wheel. The invention also contemplates the use of a simple, effective and novel dressing device for truing the surface of the grinding wheel at the proper angle to correspond to the angle of the thread being cut. A machine embodying a preferred form of my invention is illustrated in the accompanying drawings, and in addition to the above mentioned objects is designed to embody various accurate adjustments whereby the machine may be adapted for a wide variety of work.

The following description which relates to the machine shown in the drawings is intended to illustrate proven methods of accomplishing the above named objects, and the essential characteristics of this invention are summarized in the claims, which are not intended to be limited to any particular details of construction.

In the drawings, Fig. 1 is a side elevation of the machine; Fig. 2 is a plan of the same; Fig. 3 is an enlarged transverse section showing the grinding wheel carrying means; Fig. 4 is a rear elevation of the same section of a portion of the bed of the machine showing this carrying means and illustrating certain adjustments thereof; Fig. 5 is a front view of this carrying means on a still larger scale showing the grinding wheel spindle and associated bearings in section; Fig. 6 is a still further enlarged detail in the nature of a vertical section through means for actuating the slides for trimming the grinding wheel; Fig. 7 is a section taken on substantially the plane of these slides and showing the actuating gear therefor and illustrating the grinding wheel in broken lines; Figs. 8 to 11 inclusive are details of the trimmer slides; Fig. 12 is a vertical longitudinal section of the master spindle and associated parts illustrating the master screw, this view being made on a scale somewhat enlarged over the scale of Figs. 1 and 2; Fig. 13 is a still further enlarged detail in the nature of a transverse section through the driving means, the plane of the section being indicated by the line 13—13 of Fig. 1, as looking toward the left in that view; Fig. 14 is a similar section taken substantially parallel to that of Fig. 13, the plane of which is indicated by the offset line 14—14 of Fig. 12; Figs. 15 to 17 inclusive are end and side elevations of special adjustable bearings embracing the master spindle; Fig. 18 is a transverse section thru the bed of the machine looking toward the dead spindle, the plane of section being indicated by the line 18—18 of Fig. 1; Fig. 19 is a longitudinal view partly in section illustrating the dead spindle and carrying stock therefor, and the means for longitudinally moving said spindle to follow the work as moved by the master screw.

The numeral 10 designates the bed of the machine supporting a head stock 12 and tail stock 14, and the carriage 16 for the grinding wheel.

As shown particularly in Figs. 2 and 14 the work on which the threads are to be cut is illustrated at W and is supported at its ends on the centers carried by and forming part of the live and dead spindles 23 and 24 respectively. The work may be rotated by the live spindle through a dog 25.

Within the head stock 12 the spindle 23 carries the master screw or hob 25 comprising a sleeve which is shown removably secured to the spindle by a nut 13 engaging the threaded end of the spindle. A collar 21 rigid with the spindle and having a pin 22, is adapted to engage corresponding recesses in the end of the master screw 25 to prevent its turning on the spindle. The screw 25 rotates within a fixed nut 26 and is driven by means of a gear 27 meshing with an elongated pinion 28, which in turn is driven through suitable gearing from a pulley 29. The nut 26 is shown tightly fitted within a collar 17, in turn fitted within the flanged end of the casing 12. A cap 18 having its end threaded as at 19 to engage the collar 17 may be provided to house the end of the spindle 23 carrying the master gear. This cap and the nut on the end of the spindle may be easily removable to permit changing the master screw when it is desired to grind a thread of different pitch.

The dead spindle 24 may be urged constantly against the work to follow the live spindle as it is moved by the master screw 25, by the means particularly illustrated in Figs. 18 and 19. As there shown the outer end of the spindle 24 is provided with rack teeth 30 meshing with a pinion 31 on a shaft carrying the pulley 32 from which hangs a suitable weight 33.

The grinding means is mounted on a longitudinally movable carrier 16 and as illustrated in Figs. 1 to 5, comprises a wheel 35 mounted on a spindle or arbor 36 supported within conical bearings 37 and 38 carried within the arms of a yoke 47 pivotally mounted on the shaft 46 in a transversely movable guiding head 55. The bearing 37 is preferably under the constant tension of a spring pressed plunger, while the bearing 38 is under a variable tension adapted to be adjusted by thumb screws 39 operating the spring 40 and plunger 41. Rigidly secured to the spindle 36 as by screw threaded means is a pulley 51, over which is adapted to run the belt 52 constantly driven from means, not shown, whereby the grinding wheel 35 is rotated at the speed desired. As shown the pulley 51 has a sleeve extension 52 adapted to support the grinding wheel 35 at one side while a nut 53 on the opposite end of the spindle supports the opposite side suitable washers 54 being interposed. Secured to the shaft 46 at the rear of the carrier 16 is an arm 42 which is engaged by thumb screws 43 in the head 55, whereby the grinding wheel 35 may be tilted to conform to the pitch angle of the thread being cut. The upper end 44 of the arm 42 constitutes a movable indicator adapted to cooperate with a fixed scale 45 on the head 55. Rigid with the head is a slide holder 56, comprising a frame having intersecting slots carrying means adapted to true the surface of the wheel to maintain and conform to the desired thread angle. This means comprises slides 61 and 62 which are crossed at a sixty degree angle within the slide holder. A cover plate 57 may be secured to the slide holder as by screws 58. Obviously the slide holder may be changed, when desired, to provide a different cutting angle on the driving wheel. The slides 61 and 62 carry, clamped by set screws 59 within their ends adjacent to the wheel, the members 30, constituting holders for the diamond tools 64. These slides 61 and 62, shown particularly in Figs. 6 to 11, comprise rack bars having their engaging contact faces diagonally recessed whereby their relative movement may be controlled.

Meshing with these bars is a toothed pinion 65 on a stud 68 journaled in the slide holder and extending upwardly to carry a crank handle 69, by which the slides may be moved alternately forwardly and backwardly across the edge of the wheel; thus presenting the diamond tools 64 to the opposite cutting faces of the wheel thereby accurately trimming the cutting surface of the wheel to the desired angle. This trimming is preferably done only when the axis of the grinding wheel is parallel to the axis of the work, that is, when the indicator 44 stands at zero on the scale 45. To hold the diamond dressers normally away from the wheel, I mount a spring 66 within a cavity in the pinion 65 and connect one end to the slide holder and the other to the pinion, whereby when the handle 69 is released the turning effort of the spring moves the slides to the position indicted in Fig. 7.

In the grinding operation means is provided whereby the rotation of the live spindle may be reversed at the end of a cut and the grinding wheel made to traverse the work in the opposite direction. The means for accomplishing this is shown particularly in Figs. 12 and 13. As there shown, a shaft 70, within a bushing 72, is constantly driven from the step pulley 29 (Fig. 2) and carries a bevel gear 71 meshing with two oppositely rotating bevel gears 73 and 74 loosely mounted on a shaft 75 on which is also mounted the elongated pinion 28, for transmitting the drive from the shaft 70 to the gear 27 on the live spindle 23. Parallel with the shaft 75 is a longitudinally movable shaft 78 within suitable bearings in the head stock frame 12 and carrying on a collar 90 a yoke 79 embracing a clutch member 80 splined to the shaft 75 and adapted to engage one or the other of the bevel pinions 73 and 74 when in either of its extreme positions. Adjacent to the pinion 28, this shaft 78 has right and left hand threaded portions 83 and 84 carrying stops 85 and 86 adjustable by means of a thumb nut 88 on a projecting end of the shaft 78. These stops have mounted therein rollers 87 adapted to bear against the sides of the gear 27 when the latter, carried by the live spindle 23 moved longitudinally under the control of the thread 25 reaches its extreme positions, as determined by the adjustment of the stops 85 and 86 on the shafts 78. After the gear 27 strikes either stop it moves the latter with the shaft 78 longitudinally an amount sufficient to shift the clutch from engagement with one bevel gear to the other. To complete this shifting movement and secure the engagement of the clutch 80 with one or the other of the bevel gears 73 and 74, a latch 91, operated by a spring 94 and guided within a hollow plug 93, is adapted to enter one of the other of the notches 92 provided on a collar 90 rigid with the arm 79, The gearing described above is housed within the headstock 12 in compartments 100 and 102 which may constitute oil or grease chambers having removable tops 103 with lubricant caps 104 therein.

As shown the live spindle 23 is mounted within the head stock in bearings of the special construction illustrated in Figs. 12 and 15 to 17. These bearings comprise the slotted cones or plugs 95 having threaded ends 96 and 97 adapted to be mounted within the bearing housing 98 and 99 of the frame 12. Caps 105 are threaded on the bearing plugs 105 against gaskets 106 and constitute therewith oil tight stuffing boxes to prevent leakage from the compartments 100 and 102.

The slide or carriage 16 may be clamped in various positions on the ways 10 by means of T-headed bolts such as indicated at 115 engaging a corresponding slot 116 extending longitudinally of the bed of the machine. The slide 16 carries cross ways 107 embraced by the base 108 supporting the head 55 from which depends the usual nut 109 embracing a screw 110 on the end of which is the usual crank handle 112 by which the grinding wheel may be moved toward or away from the work and such movement may be accurately measured by coacting graduated disks 114, one of which is carried by the slide 16 and the other by the screw 110.

The tail stock 14 may be adjusted longitudinally of the bed 10 and clamped in various positions by a T-headed clamping member 120 engaging a slot 121 in a bed 10 and extending upwardly into a boss 122 in the tail stock. Normally urged downwardly by a spring 123 eccentrically engaging a lock in the clamp 120 is a transverse shaft 124 adapted to be rocked by a handle 125 to release or set the clamp.

The operation of the machine above described is briefly as follows:

Assuming that a piece of work "W" has been placed on the centers of the spindles 23 and 24, the weight 33 acts to urge the spindle 24 toward the work and into engagement therewith. The grinding wheel, having been tilted by turning the screws 43 to the proper angle corresponding with the pitch angle of the thread to be cut, is now brought into engagement with the work, while the spindle 36 is rotated by the belt 52 as previously described. Power is at the same time applied to the pulley 29 and is transmitted through gear 71 to the elongated pinion 28, and thence to the gear 27 rotating the master gear shaft 23 which serves as the supporting spindle for one end of the work piece or its mandrel. Thus the work is advanced by reason of the rotation of the shaft 23, the master screw 25 in its nut 26 advancing the spindle with precision and moving the work at a definite rate of advancement past the grinding wheel 35. When the end of the work is reached, the gear 27 engages the roller 87, which has been previously set, resulting in moving the shaft 78 and shifting the clutch 80 through the yoke 79, thus reversing the direction of rotation of the gears 28, 27 and the master screw. As the spindle recedes the work is urged toward it by reason of the weight moving the spindle 24, and the pressure caused by this weight is sufficient to eliminate any back-lash or play in the engagement of the master screw with its nut. As the operation continues the handle 112 is operated to advance the grinding wheel into the work until the thread is ground to the proper depth. From time to time the surface of the wheel may be trued by moving the crank handle 69 to dress it by means of the slides carrying the diamond points 64.

It will be seen that I have provided a simple and effective mechanism capable of great accuracy and capable of adjustment to various sizes and to screw threads of different character, the principal adjustments being that of the tilting of the grinding wheel spindle and moving of the grinding wheel spindle toward and away from the work, the shifting of the carriage 16 and the shifting of the tail stock 14. The bearings for the spindles 23 and 24 are adjustable in their casings so that they may be maintained perfectly tight at all times.

I claim:

1. In combination, a tail stock comprising two upright standards, a spindle slidably mounted in each standard, said spindle having rack teeth on the under side thereof, a pinion extending transversely of the spindle and having an extension projecting beyond the sides of the standard, a pulley mounted on the extension, and gravitational means extending over the pulley for urging said spindle in one direction.

2. In combination, a tail stock, a spindle slidable therein, said spindle having rack teeth on the under side thereof, a shaft extending through the tail stock beneath the spindle and at right angles thereto, a pinion on the shaft co-operating with the rack teeth, a pulley on said shaft on one side of the tail stock, a hand wheel on said shaft on the opposite side of the tail stock, and means for suspending a rope over said pulley for normally urging the spindle in one direction.

3. In a grinding machine, a longitudinally movable carrier, a transversely movable head thereon, a horizontal stub shaft within said head, an arbor supported by said shaft having its axis perpendicular to the shaft, a grinding wheel rigid on said arbor, means for constantly rotating said arbor, and means at the other end of said shaft for oscillating the same.

4. In a grinding machine, a longitudinally movable carrier, a transversely movable head thereon, a horizontal stub shaft within said head, a yoke secured to one end of said shaft, an arbor mounted in resilient bearings in said yoke, a grinding wheel on said arbor, means for constantly rotating said arbor, and means at the other end of said shaft for oscillating the same.

5. A support for a grinding wheel comprising a longitudinally and transversely movable head, a horizontal shaft within said head, a yoke carried at one end of said shaft, bearings in the arms of said yoke, an arbor mounted within said bearings, a grinding wheel and pulley rigid on said arbor, means for constantly rotating said pulley, and means for oscillating said shaft.

6. A support for a grinding wheel comprising a head, a shaft rotatable within said head, a yoke carried by said shaft, resilient bearings in the arms of said yoke, one being under constant and the other under variable tension, an arbor mounted within said bearings, a grinding wheel on said arbor, means for retaining it in position including a pulley rigid on said arbor and means for rotating said pulley.

7. A grinding wheel support comprising a movable head, a grinding wheel pivotally mounted within said head, means for oscillating said wheel upon its pivot comprising an arm secured thereto, and thumb screws engaging the sides of said arm.

8. A grinding wheel support comprising a movable head, a grinding wheel pivotally mounted within said head, means for oscillating said wheel upon its pivot comprising an arm secured thereto, thumb screws engaging the sides of said arm, and means for indicating the amount of oscillation imparted to said shaft by means of said thumb screws.

9. A grinding wheel support comprising a movable head, an angularly adjustable shaft within said head, a yoke connected to said shaft, a bearing under constant tension in one arm of said yoke, a bearing under variable tension in the opposite arm, an arbor supported within said bearings, a grinding wheel on said arbor, and means for rotating said arbor.

10. In a grinding machine, the combination with a machine bed, of a work supporting spindle carried thereon, a drive shaft parallel to the spindle, oppositely rotating gears mounted on said shaft, a clutch intermediate said gears, a member extending parallel to the spindle, a pair of stops adjustably mounted on said member, and a gear actuated by the spindle for engaging said stops to move the clutch, whereby rotation of the spindle is reversed.

11. In a grinding machine, the combination with a bed, of a spindle rotatably and longitudinally movable thereon, a drive shaft disposed beneath the spindle, gearing operatively connecting the shaft and spindle, a member having right and left hand threaded portions extending substantially throughout the length thereof, stops mounted on the threaded portions and adapted to be engaged by said gearing, and means associated with said member, whereby movement thereof reverses the operation of said spindle.

12. In a grinding machine, the combination of a machine bed, of a carriage slidably mounted thereon, a grinding wheel mounted on the carriage, means for oscillating the wheel, a work supporting spindle carried by the bed and adapted to be simultaneously rotated, and longitudinally moved, and means for reversing the movement of said spindle at a predetermined point in its longitudinal movement in either direction.

13. In a grinding machine, the combination with a machine bed having a carriage slidably mounted thereon, a grinding wheel supported on the carriage, a work supporting spindle rotatably mounted on and movable longitudinally of said bed, means for feeding the wheel into the work and transversely of the axis thereof, means for oscillating the wheel and adjustable means for reversing the rotation and longitudinal movement of the spindle.

14. A head stock adjustably clamped to a support, a spindle therein, a master screw fixed to said spindle for guiding its movement longitudinally, means for rotating said spindle while permitting its longitudinal movement, and means carried by the spindle for reversing its direction of rotation upon reaching a predetermined limit in its longitudinal movement.

15. In a head stock, a nut fixedly mounted therein, a spindle supported in bearings in alignment with said nut, a removable sleeve mounted on said spindle and having screw threads engaging said nut, and means for rotating said spindle.

16. In a grinding machine, the combination with a head stock, of a work supporting spindle supported in bearings therein, a master screw at one end of said spindle, a nut fixed within said head stock embracing said screw, means comprising a gear and elongated pinion for rotating the spindle, stops disposed on either side of said gear and arranged to be engaged thereby, and means actuated by the stop for reversing the direction of rotation of said spindle.

17. In combination, a spindle, oppositely rotating gears for actuating the spindle, a clutch intermediate the gears for alternately connecting them to cause reversal of spindle rotation, a clutch shifting member, stops carried thereby, means whereby rotation of said member moves said stops simultaneously and in opposite directions, and means carried by the spindle for engaging said stops, whereby the clutch is shifted and the direction of the spindle operation is reversed.

18. In a thread grinding machine, a live center, a collar rigid with said center, a pin on said collar, a master screw comprising a sleeve adapted to embrace said center having one end recessed to accommodate said collar, a pin, and means for retaining said sleeve on said center.

19. In a head stock, a spindle therein, a master screw thereon for causing its longitudinal movement when rotated, rotating means for said spindle including a shaft at right angles to said spindle constantly rotated in one direction, a second shaft parallel to said spindle carrying loosely mounted thereon members rotating in opposite directions, a clutch connected to said spindle shiftable between said members, and a gear engageable from said spindle at either extreme longitudinal position for shifting said clutch to reverse the direction of rotation of said spindle.

20. A spindle, and means for rotating the same, including oppositely rotating, alternately connected gears, means whereby rotation of the spindle causes its longitudinal movement, means comprising a longitudinally movable clutch shifting member, a clutch between said gears, stops on said member, and means whereby said spindle may engage one of said stops to shift the clutch and reverse the direction of movements of said spindle.

21. A spindle, and means for rotating the same, including oppositely rotating, alternately connected gears, means whereby rotation of the spindle causes its longitudinal movement, means comprising a longitudinally movable clutch-shifting member, a clutch between said gears, stops on said member, means whereby said spindle may engage one of said stops to shift the clutch and reverse the direction of movements of said spindle, and means for adjusting said stops to cause the reversal of the spindle after predetermined longitudinal movements.

22. A live spindle having a master thread thereon coacting with a fixed nut whereby when rotated it will move longitudinally, a shaft parallel with said spindle, intermeshing pinions on the shaft and spindle, one of said pinions being elongated whereby it is in constant mesh with the other, loose gears on said shaft, a clutch splined to the shaft between said gears, means for constantly rotating said gears in opposite directions, a second shaft longitudinally movable and parallel with the first, means carried thereby embracing said clutch, and stops carried thereby adapted to be engaged at either extreme of the longitudinal movement of the spindle whereby said clutch will be shifted from engagement with one gear to the other to reverse the movement of the spindle.

23. A spindle having a master thread thereon coacting with a fixed nut, a gear secured to said spindle, an elongated pinion on a shaft parallel with said spindle in constant mesh with said gear, loose gears on said shaft, means for constantly rotating said gears in opposite directions, a clutch slidable on said shaft between said gears, a second shaft parallel to the first, right and left handed threads thereon adjacent to said pinion, stops carried by said threads adapted to be engaged by said spindle gear at either extreme of its longitudinal movement as imparted by the master thread, a yoke carried by said second shaft embracing said clutch, means whereby said clutch is shifted from engagement with one gear to the other when either of said stops is engaged by said spindle gear.

24. In a grinding machine, a head stock, a spindle movable therein under the influence of a master screw carried by said spindle, an adjustable bearing for said spindle comprising a cone alternately slotted from each end through a portion of its length, and removable enclosing means secured to the ends of the cone.

25. In a grinding machine, a head stock, a spindle movable therein under the influence of a master screw carried by said spindle, an adjustable bearing for said spindle comprising a slotted conical member, and caps removably secured to the ends of said member.

26. In a grinding machine, a head stock, a spindle movable therein under the influence of a master screw carried by said spindle, an adjustable bearing therefor comprising a tapered ring, alternately slotted from either end to a point falling short of the opposite end, the ends of said ring being screw threaded, and apertured caps threaded on said ends.

In testimony whereof, I hereunto affix my signature.

EDWIN R. TOZER.